United States Patent
Piedl et al.

(10) Patent No.: US 6,472,841 B1
(45) Date of Patent: Oct. 29, 2002

(54) LOW COST REDUNDANT RESOLVER SYSTEM

(75) Inventors: Martin Piedl, Blacksburg; Moe K. Barani, Radford; Ron Flanary, Blacksburg, all of VA (US)

(73) Assignee: Aspen Motion Technologies, Inc., Radford, VA (US)

(*) Notice: Subject to any disclaimer, the term of this patent is extended or adjusted under 35 U.S.C. 154(b) by 0 days.

(21) Appl. No.: 09/806,624

(22) PCT Filed: Sep. 3, 1999

(86) PCT No.: PCT/US99/19886

§ 371 (c)(1),
(2), (4) Date: Mar. 29, 2001

(87) PCT Pub. No.: WO00/14695

PCT Pub. Date: Mar. 16, 2000

Related U.S. Application Data

(60) Provisional application No. 60/099,029, filed on Sep. 3, 1998.

(51) Int. Cl.⁷ .................................................. G05B 1/06
(52) U.S. Cl. ........................ 318/661; 318/605; 341/112; 310/168
(58) Field of Search .................................. 318/605, 661; 341/112, 114, 116, 117; 310/168

(56) References Cited

U.S. PATENT DOCUMENTS

| | | | | |
|---|---|---|---|---|
| 3,849,774 A | * | 11/1974 | Barth .................. | 340/347 DA |
| 4,795,954 A | * | 1/1989 | Sakurai et al. ............... | 318/661 |
| 5,644,224 A | * | 7/1997 | Howard ....................... | 324/165 |
| 5,708,344 A | * | 1/1998 | Hayashi et al. ............. | 318/605 |
| 5,760,562 A | * | 6/1998 | Woodland et al. .......... | 318/632 |
| 6,084,376 A | * | 7/2000 | Piedl et al. ................. | 318/605 |

* cited by examiner

*Primary Examiner*—Robert E. Nappi
*Assistant Examiner*—Rina I. Duda
(74) *Attorney, Agent, or Firm*—Quarles & Brady LLP

(57) ABSTRACT

A resolver (20, 21) is provided with redundant excitation windings in which only a single excitation winding (E1) is energized externally. Cross coupling from the externally energized winding (E1) excites the other excitation winding (E2). A control circuit (27, 28) monitors the excitation of the redundant excitation winding (E2) and switches the excitation to the redundant excitation winding (E2) in the event of a failure of the externally winding (E1).

6 Claims, 4 Drawing Sheets

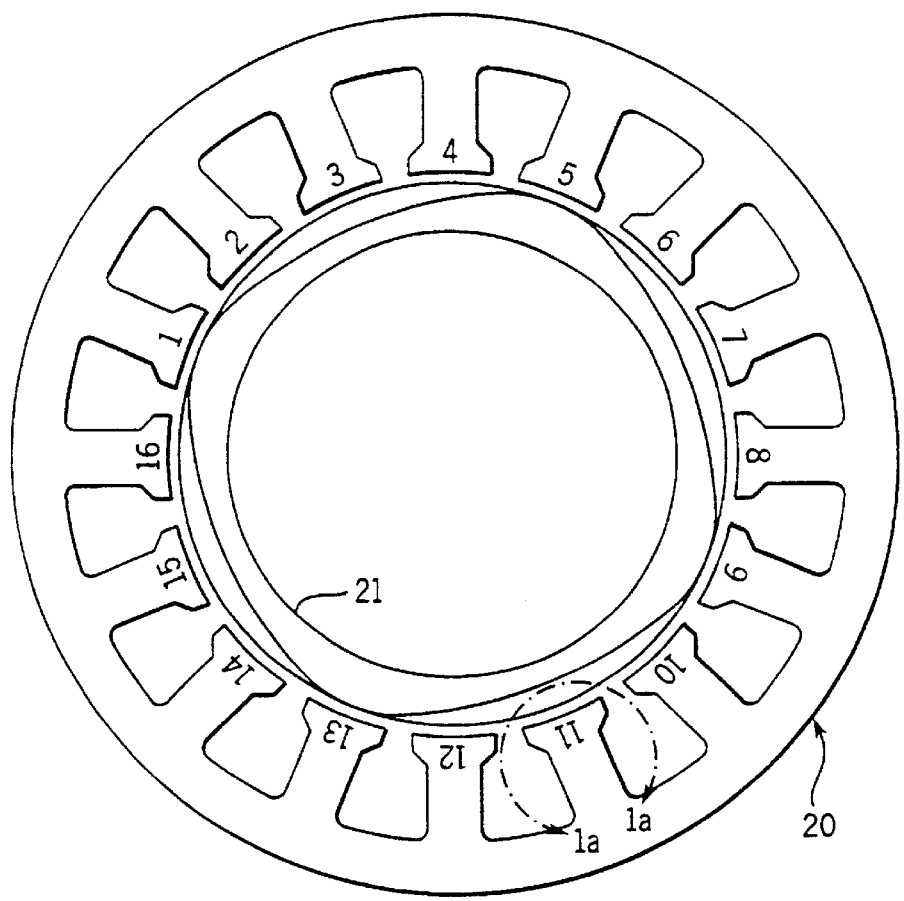
FIG. 1
FIG. 1a
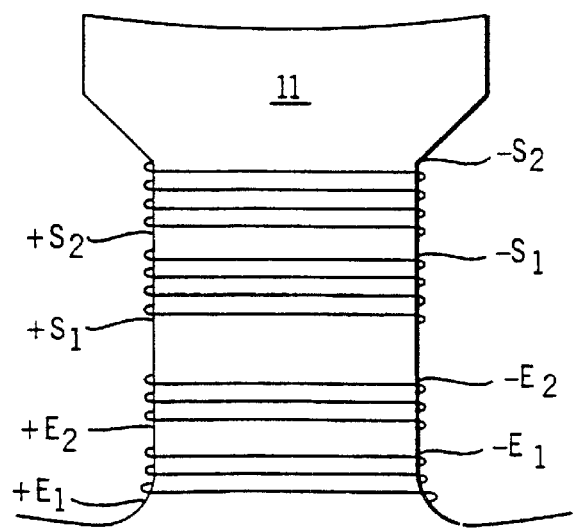

LOW COST REDUNDANT RESOLVER SYSTEM

This appln is a 371 of PCT/US99/19886 filed Sep. 3, 1999 which claims benefit of Prov. No. 60/099,029 filed Sep. 3, 1998.

FIELD OF THE INVENTION

This invention relates to resolvers, and more particularly, to an improved resolver with redundant excitation windings.

BACKGROUND ART

Certain specific applications require a shaft position, feedback device which is redundant for safety purposes, but must be inexpensive in order to be feasible for the application. Typically, two independent feedback devices are needed to achieve the redundancy required for the application. In order to minimize cost, it is desirable to wind a single resolver stator lamination stack with two excitation windings and two sets of output windings which are coupled through a single rotor rather than providing separate stator lamination stacks and separate rotor pieces. Using conventional winding techniques with two resolver windings on a single core, excited independently, results in cross coupling between the redundant windings preventing them from being totally independent from one another. This results in a distorted wave form from the output windings which causes the decoded feedback information to be inaccurate.

SUMMARY OF THE INVENTION

An object of this invention is the provision of a resolver with redundant windings that minimizes the cross coupling between the windings while, at the same time, maintaining symmetrical output signals.

Briefly, this invention contemplates the provision of a resolver with redundant excitation windings in which only a single excitation winding is energized externally at a given time. Cross coupling from the externally energized winding induces a voltage in the other excitation winding. A control circuit monitors the voltage on the redundant winding and switches the excitation to the redundant winding in the event of a failure of the externally excited winding or its excitation source.

BRIEF DESCRIPTION OF THE DRAWINGS

The foregoing and other objects, aspects and advantages will be better understood from the following detailed description of a preferred embodiment of the invention with reference to the drawings, wherein:

FIG. 1 is a end view of a wound resolver with redundant windings.

FIG. 1a is a detail view taken in the region indicated by line 1–1a in FIG. 1.

DETAILED DESCRIPTION OF THE PREFERRED EMBODIMENTS

FIG. 1 shows a redundant variable reluctance resolver, having a stator 20 and a rotor 21, the stator having sixteen teeth 1–16 on which coils of several windings to be described are disposed and connected together to form windings. FIG. 1a shows coils from excitation windings E1 and E2 and sine windings S1 and S2. This redundant resolver has two or more excitation windings, in this case E1 and E2, which receive input drive signals, and sine output windings S1 and S2 and cosine output windings C1 and C2 which provide output signals. In this example, the first excitation winding E1 has coils disposed on all sixteen teeth of the stator 20 and the second excitation winding E2, also with coils disposed on all sixteen teeth 1–16, is redundant. Typically, the redundant excitation windings E1 and E2 are excited independently. However, unless the signals in windings E1 and E2 are closely synchronized with one another, cross coupling between the windings E1 and E2 will distort the resolver outputs.

As seen in FIG. 1a, there is a requirement that the windings on each tooth not be overlapping each other along the length of the tooth 11. FIG. 1a shows only one set of coils for the respective windings, with it being understood that the coils on the respective teeth 1–16 are electrically connected together to form the respective windings. Table 1 below shows the arrangement of the coils on the respective teeth 1–16 in FIG. 1 with "cw" meaning the winding of a coil a number of turns in a "clockwise" direction and "ccw" meaning the winding of a coil a number of turns in a "counterclockwise" direction around a tooth.

TABLE 1

| Tooth | E1 | E2 | S1 | S2 | C1 | C2 |
|---|---|---|---|---|---|---|
| 1 | cw | cw | cw | cw | — | — |
| 2 | ccw | ccw | — | — | cw | cw |
| 3 | cw | cw | ccw | cw | — | — |
| 4 | ccw | ccw | — | — | ccw | ccw |
| 5 | cw | cw | cw | cw | — | — |
| 6 | ccw | ccw | — | — | cw | cw |
| 7 | cw | cw | ccw | cw | — | — |
| 8 | ccw | ccw | — | — | ccw | ccw |
| 9 | cw | cw | cw | cw | — | — |
| 10 | ccw | ccw | — | — | cw | cw |
| 11 | cw | cw | ccw | cw | — | — |
| 12 | ccw | ccw | — | — | ccw | ccw |
| 13 | cw | cw | cw | cw | — | — |
| 14 | ccw | ccw | — | — | cw | cw |
| 15 | cw | cw | ccw | cw | — | — |
| 16 | ccw | ccw | — | — | ccw | ccw |

Figure 2:
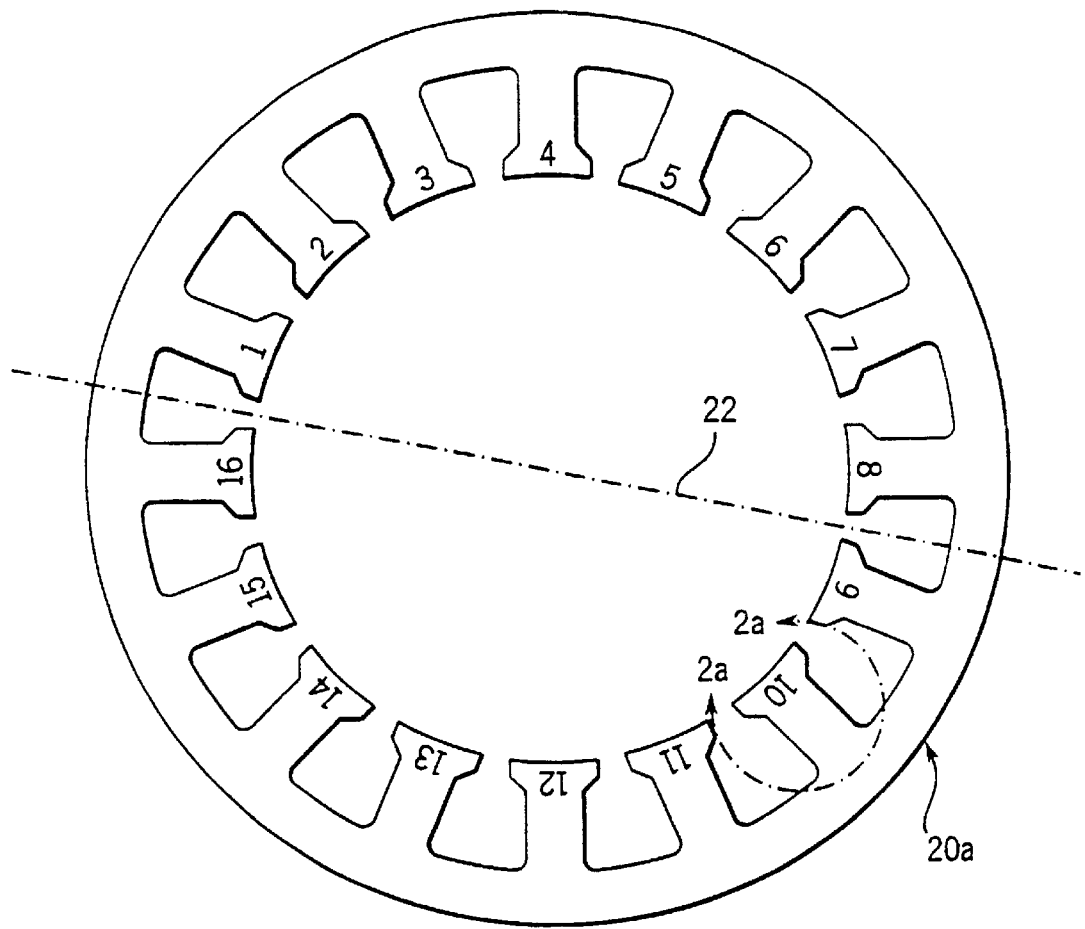
FIG. 2 is an end view of another resolver having redundant windings.

FIG. 2 shows another resolver with physically separated excitation windings E1, E2, sine output windings S1, S2 and cosine output windings C1, C2 wound on a stator 20a (the rotor is not shown). In this configuration, the first excitation winding E1 is wound only on teeth 1–8, while the redundant excitation winding E2 is wound only on teeth 9–16, thus placing the windings E1 and E2 in separate 180-degree sections of the stator 20a, as shown by dividing line 22. This arrangement effectively decouples the two windings except in the area where winding E1 on tooth 1 is next to winding E2 on tooth 16, and where winding E1 on tooth 8 is next to winding E2 on tooth 9. The wave forms of the sine and cosine outputs are distorted as a result of the coupling between winding E1 and winding E2 which occurs between teeth 1 and 16 as well as between teeth 8 and 9, as seen in FIG. 2. If the inputs to excitation winding E1 and excitation winding E2 were synchronized, the sine and cosine output windings would output symmetrical wave forms. However, in the event of a failure of either excitation winding E1 or excitation winding E2, the output wave forms would revert back to distorted wave forms resulting in an unusable signal.

Therefore, the invention provides that one excitation winding E1 be excited, and the excitation winding E2 be excited only in the event of a failure of excitation winding E1.

Figure 2A:
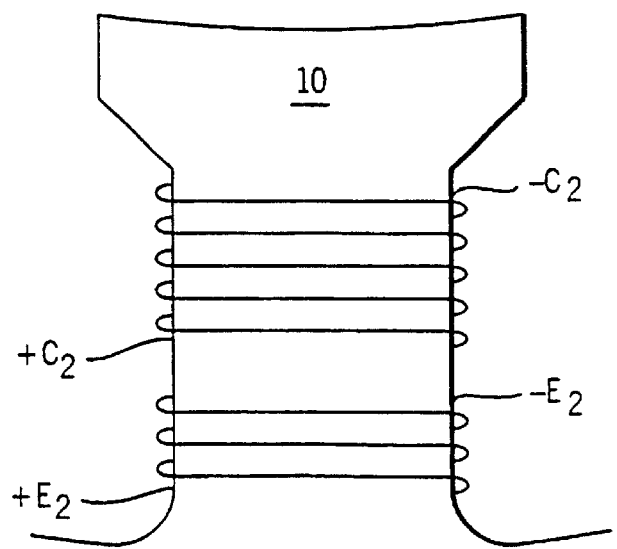
FIG. 2a is a detail view taken in the region indicated by line 2a—2a in FIG. 2.

FIG. 2a illustrates the windings on tooth 10 including winding E2 with inputs E2+ and E2−, and the cosine winding C2 with outputs C2+ and C2−. Table 2 below shows the arrangement of the coils on the respective teeth 1–16 in FIG. 2.

TABLE 2

| Tooth | E1 | E2 | S1 | S2 | C1 | C2 |
|---|---|---|---|---|---|---|
| 1 | cw | — | cw | — | — | — |
| 2 | ccw | — | — | — | cw | — |
| 3 | cw | — | ccw | — | — | — |
| 4 | ccw | — | — | — | cw | — |
| 5 | cw | — | cw | — | — | — |
| 6 | ccw | — | — | — | ccw | — |
| 7 | cw | — | ccw | — | — | — |
| 8 | ccw | — | — | — | ccw | — |
| 9 | — | cw | — | cw | — | — |
| 10 | — | ccw | — | — | — | cw |
| 11 | — | cw | — | ccw | — | — |
| 12 | — | ccw | — | — | — | ccw |
| 13 | — | cw | — | cw | — | — |
| 14 | — | ccw | — | — | — | cw |
| 15 | — | ccw | — | ccw | — | — |
| 16 | — | ccw | — | — | — | ccw |

Figure 3A:
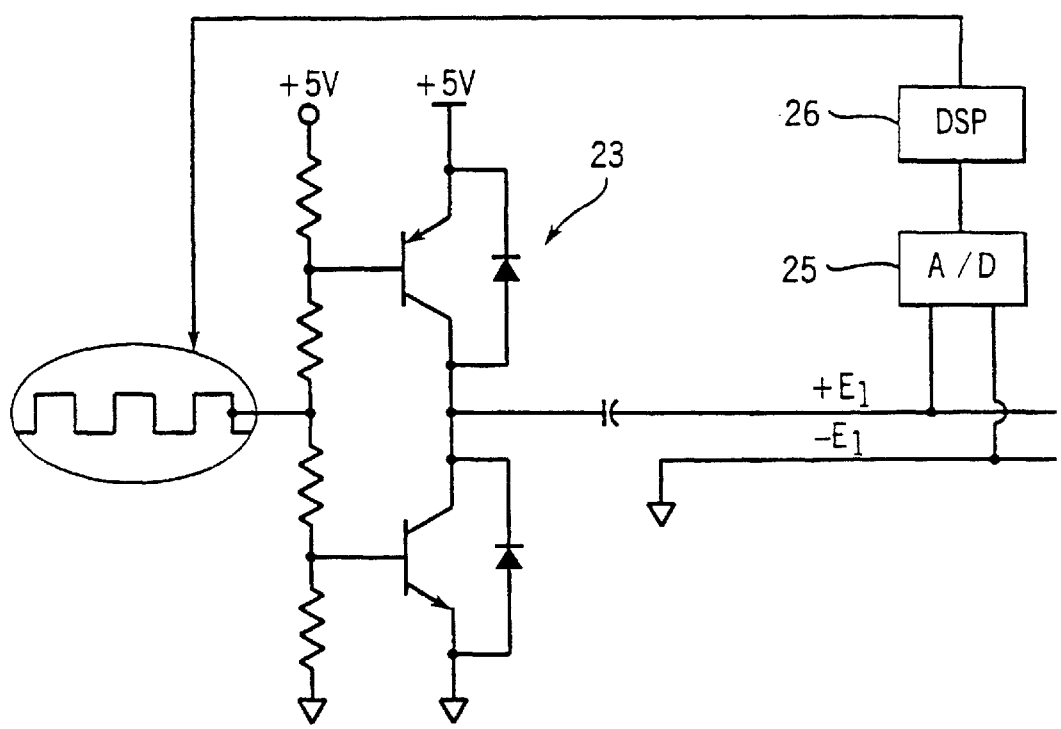
FIGS. 3a and 3b are schematic diagrams of a control circuit according to the present invention.
Figure 3B:
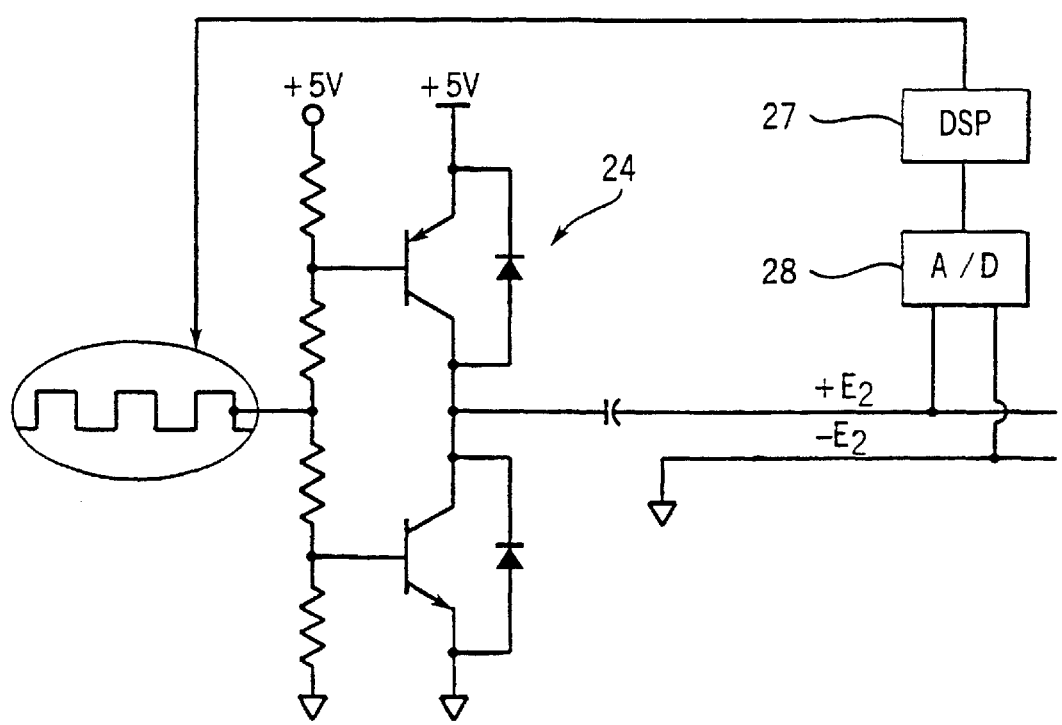

Referring now to FIGS. 3a and 3b, the invention is preferably used with the resolver of FIG. 1. The embodiment in FIG. 2 is less advantageous in that if either of the excitation windings E1 and E2 fails, a half section of the stator is not excited. An excitation driver circuit 23 provides drive signals to inputs +E1, −E1 for excitation winding E1. An analog-to-digital (A/D) converter section 25 has two inputs connected to monitor power signals supplied to excitation winding E1. This analog-to-digital (A/D) converter section 25, in turn, is connected to a microelectronic digital signal processor (DSP) 26, and may, in fact, be integrated into a single integrated circuit with the DSP 26. The DSP 26 has an output connected to control the switching on and off of the driver circuit 23 at input 23a.

Similarly, in FIG. 3b, an excitation driver circuit 24 provides drive signals to inputs +E2, −E2 for excitation winding E2. The analog-to-digital (A/D) converter section 28 also has additional inputs connected to monitor voltages on excitation winding E2. These signals are converted to digital signals and input to a second DSP 27. The DSP 27 has an output connected to control the switching on and off of the driver circuit 24 at input 24a.

In accordance with the teachings of this invention only a single excitation winding is excited at any one time. Specifically, excitation driver circuit 23 excites the excitation winding E1 while the voltage induced in excitation winding E2 from excitation winding E1 is detected by the DSP 27. Excitation driver circuit 24 does not excite excitation winding E2 in normal operation. However, when the control circuit 27, 28 detects that there is not an induced voltage in excitation winding E2, the logic activates excitation driver circuit 24 to excite winding E2.

Figure 4:
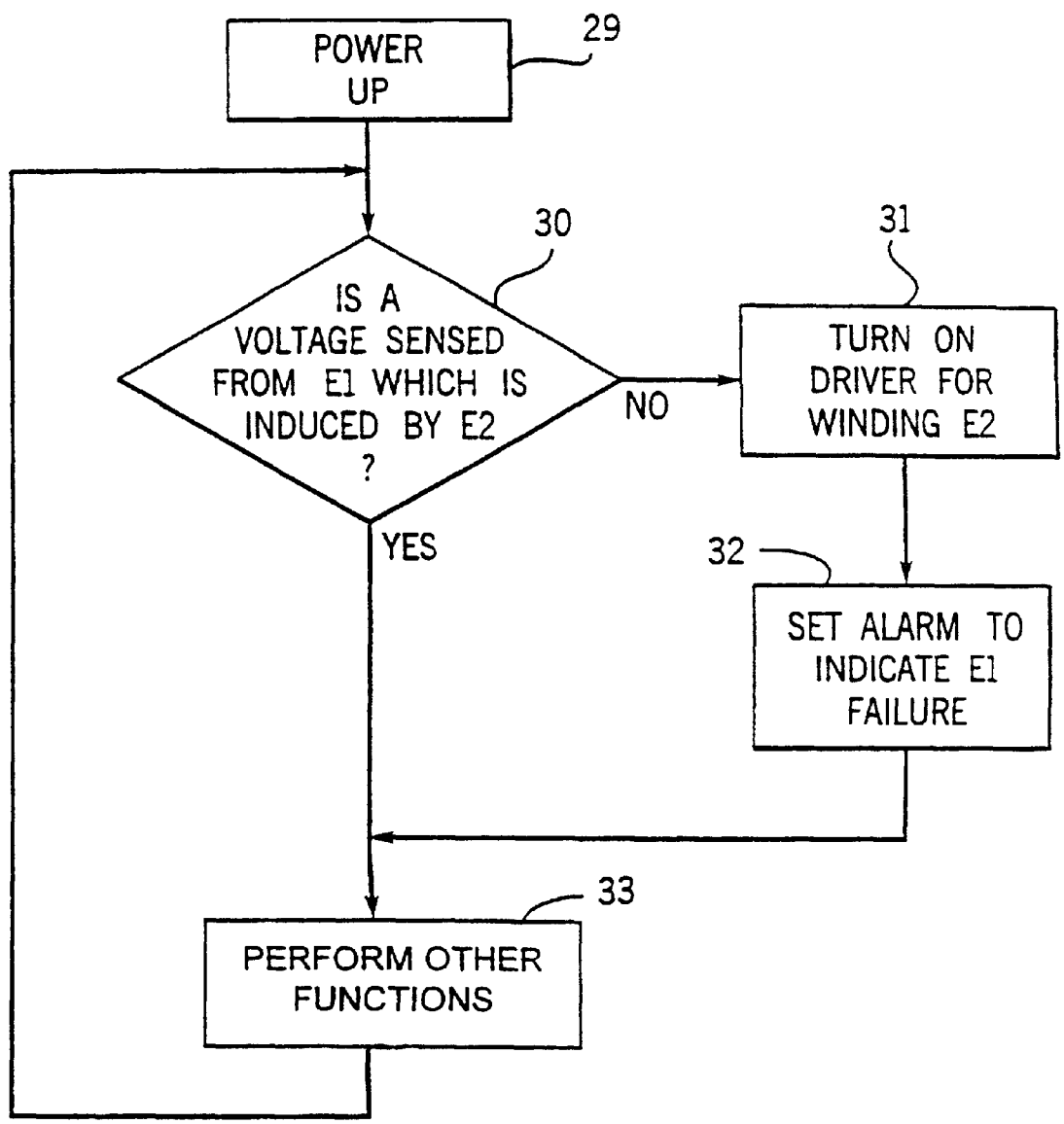
FIG. 4 is a flow chart of the operation of the control circuit of FIGS. 3a and 3b.

FIG. 4 is a flow chart which illustrates the operation of the DSP 27 in executing program instructions to establish the functionality of the excitation windings E1 and E2. Upon power up of drive circuit 23, represented by start block 29, the processor 27 executes instructions to read the voltage induced in winding E2 from winding E1. The processor 27 then executes instructions to determine whether there is measurable voltage induced in winding E2, as a result of power to winding E1, as illustrated by decision block 30. If the result is "Yes," then the processor 27 will proceed to execute instructions to perform other functions as represented by process block 33. If the answer is "No," it means that power to winding E1 has been lost, and the processor 27 will excite winding E2 by transmitting a control signal to driver circuit 24, as represented by process block 31. The processor will also set an alarm in memory as represented by process block 33. This alarm condition will be sensed by an appropriate routine and the system will power down or other corrective action will be taken. In the meantime, the processor 27 will loop back to perform other functions through execution of block 33. In a further variation of the above-described routine, in the event of a "No" result in decision block 30 that a further signal be sent from the DSP 27, either to the first DSP 26, or directly to driver circuit 23, to positively turn off the driver circuit 23 for winding E1.

Thus, a resolver is provided with redundant excitation windings and a control circuit for monitoring these windings and switching power to another one of the windings, if one of the windings fails.

Having thus described the present invention and its preferred embodiments in detail, it will be readily apparent to those skilled in the art that further modifications to the invention may be made without departing from the spirit and scope of the invention as presently claimed.

We claim:

1. In a resolver having a stator and a rotor, the stator having at least a first excitation winding, and first and second output windings, an improvement which comprises:

a first excitation driver circuit to drive said first excitation winding;

a second excitation winding disposed on the stator;

a second excitation driver circuit to drive said second excitation winding;

a control circuit for sensing an induced voltage in said second excitation winding induced by the excitation of the first excitation winding; and wherein said control circuit responds to a lack of induced voltage in the second excitation winding to switch on the second excitation driver circuit.

2. The improvement of claim 1, wherein said control circuit comprises a microelectronic processor for executing program instructions to sense an induced voltage in said second excitation winding and to control switching of the second excitation driver circuit.

3. The improvement of claim 1, wherein the first excitation winding and the second excitation winding are disposed on each of the teeth of the stator.

4. The improvement of claim 1, wherein the output windings of the resolver include at least one sine winding and at least one cosine winding.

5. The improvement of claim 1, wherein the output windings of the resolver include at least two sine windings and at least two cosine windings.

6. The improvement of claim 5, wherein the sine windings and cosine windings are disposed on the stator in the sequence provided in Table 1.

* * * * *